Patented July 1, 1924.

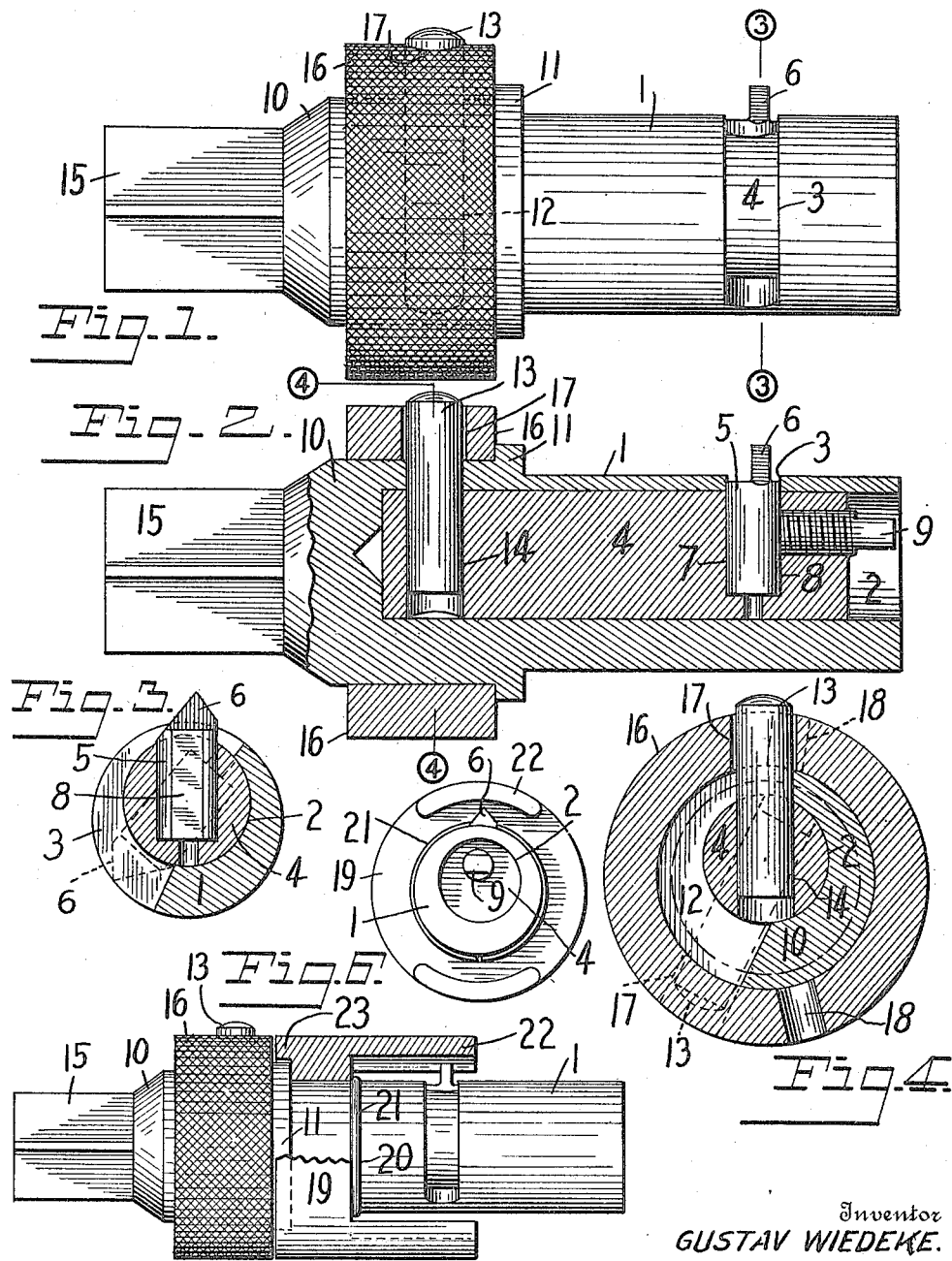

1,499,429

UNITED STATES PATENT OFFICE.

GUSTAV WIEDEKE, OF DAYTON, OHIO, ASSIGNOR TO GUSTAV WIEDEKE & COMPANY, OF DAYTON, OHIO, A FIRM.

TUBE CUTTER.

Application filed May 28, 1923. Serial No. 641,908.

*To all whom it may concern:*

Be it known that I, GUSTAV WIEDEKE, a citizen of the United States, residing at Dayton, in the county of Montgomery and State of Ohio, have invented certain new and useful Improvements in Tube Cutters, of which the following is a specification, reference being had therein to the accompanying drawing.

This invention relates to a tube cutter and is in the nature of an improvement on the device shown and described in Patent No. 1,082,984, granted December 30, 1913 to Otto Wiedeke. The tube cutter shown in that patent comprises an elongated body portion having an eccentric bore in which is rotatably mounted a tool holder. A tool carried by the tool holder has a cutting edge extending into a circumferential slot in the body portion and may be projected beyond the body portion by the relative rotation of the body portion and the tool holder. The outer end of the body portion also has a circumferential slot through which extends a pin which is seated in the tool holder and serves to indicate to the operator the position of the cutting tool, to distribute the strain on the tool holder by engaging the end of its slot, and to provide manual means for adjusting the tool holder with relation to the body portion. The end of this pin is projected some distance beyond the outer surface of the body portion to enable it to be grasped by the operator. Tool holders of this type are usually power operated and in the event of the rapid rotation of the tube cutter the projecting end of the pin is liable to strike the hand of the operator or to catch in his sleeve and to thus cause injury to him.

One object of the invention is to provide a guard for the projecting end of the pin which will substantially enclose said end of the pin and will provide means for actuating the pin and the tool holder; and which will also close the slot through which the pin extends to prevent grit or foreign matter entering the bore in the body portion.

A further object of the invention is to provide this guard ring with means to permit the removal of the pin, for the purpose of disassembling the tube cutter.

Another object of the invention is to provide such a tube cutter with means for positioning the cutting tool on the outside of the tube sheet.

Other objects of the invention will appear as the device is described in detail.

In the accompanying drawings Fig. 1 is a side elevation of a tube cutter embodying my invention; Fig. 2 is a longitudinal sectional view of the same; Fig. 3 is a sectional view taken on line 3—3 of Fig. 1; Fig. 4 is a section taken on line 4—4 of Fig. 2; Fig. 5 is a side elevation, partly in section, of such a tool holder provided with means for positioning the cutter on the outer side of the tube sheet; and Fig. 6 is an end elevation of the tube cutter shown in Fig. 5.

In these drawings I have illustrated one embodiment of my invention and have shown the same as comprising an elongated body portion 1 having a longitudinal bore 2 arranged eccentrically thereof. In the present instance, this bore opens through the inner end of the body portion but is closed at its outer end. It will be understood that the inner end of the body portion is the end that extends into the tube which is to be cut, the right hand end in the present drawings, and that the outer end may be connected with an operating device exteriorly of said tube. The body portion is provided with a circumferential slot 3, here shown as arranged a short distance from the inner end of the body portion and communicating with the bore 2. Rotatably mounted within the bore 2 of the body portion is a tool holder 4 which is here shown as cylindrical in shape. This tool holder carries a tool 5 the cutting edge or blade 6 of which extends into the slot 3 and is adapted to be projected beyond the outer surface of the body portion 1 by the relative rotation of the body portion and the tool holder. In the present instance, the shank of the tool is seated in a socket or transverse opening 7 formed in the tool holder and one side of the shank is flattened, as shown at 8 in Fig. 3, to hold the same against rotation in its socket. A screw 9 which is threaded in the end of the tool holder engages the shank of the tool to hold the same in position and, in the present instance, this screw has a flat end which, by contact with the flat side of the shank, also positions the latter to cause the cutting edge of the blade 6 to extend at right angles to the axis of the tube cutter. It will be apparent that the relative rotation of the body portion 1 and the tool holder 4 will cause the cutting edge of the tool to be retracted or projected, according to the direction of rotation.

The body portion 1 is, in the present instance, provided at its outer end with an enlarged portion or head 10 having at its inner end a circumferential flange 11 which forms a shoulder to engage the end of the tube and properly position the cutting tool within the same. In the present instance, this shoulder is placed such a distance from the tool slot 3 that the tool will be positioned on the inner side of the tube sheet. The head 10 of the body portion is also provided with a circumferential slot 12 which communicates with the bore 2. A pin 13 extending through this slot and connected with the tool holder 4 forms, in effect, a controlling lever for the tool holder and tool. Preferably the pin is slightly tapered and is driven into a transverse opening 14 in the tool holder. The arrangement of the slot is such that when the pin is at one end thereof the tool will be in its retracted position and when the pin is at the other end of the slot the tool will be in its projected position. The outer end of the body portion beyond the head 10, is squared as shown at 15, to provide means for connecting the tube cutter with a suitable operating device, which may be operated either by power or manually. Usually a cutter of this kind is power operated. When the tube is to be cut the pin 13 is actuated to retract the tool 5. The body portion of the cutter is then inserted in the tube and inasmuch as the cutting edge lies close to the surface of the tube the rotation of the body portion will cause this cutting edge to engage the surface of the tube and thus retard the rotation of the tool holder. If desired, the pin 13 may be manipulated, after the tube cutter has been inserted, to force the cutting edge of the tool firmly against the inner surface of the tube before the body portion is rotated. As the body portion rotates relative to the tool holder the cutting edge of the tool will be forced through the wall of the tube, completely piercing the same, and when the body portion has reached the end of its movement relatively to the tool holder the latter will be caused to rotate therewith, thus completely severing the tube. At the end of the operation the pin 13 is actuated to retract the tool and the cutter is then removed from the severed end of the tube.

The outer portion or head 10 of the body of the tube cutter is cylindrical in shape and I have mounted on this cylindrical portion, on the outer side of the flange 11, a guard ring 16 which is of such a width that it overlaps and closes the slot 12 in the head 10 of the body portion and it is provided with an opening 17 to receive the end of the pin 13, the thickness of the guard ring being such that the extreme end of the pin will lie adjacent to the outer end of the opening in the ring. In assembling the device the guard ring is placed in position and the pin then inserted through the opening 17 in the guard ring and the slot 12 in the head 10 and into the opening 14 in the tool holder. The pin will have a limited amount of radial movement when the body portion and tool holder are rotated relatively one to the other due to the eccentric arrangement of the bore in the body portion, and the opening 17 in the ring is such as to permit of this free movement without permitting the ring to have any appreciable rotary movement relative to the pin. Consequently the ring, which is freely rotatable upon the head 10, constitutes an actuating device for the pin and the tool holder and it also closes the slot in the head 10 so as to prevent grit and other foreign matters from passing through the slot into the bore of the body portion. To enable the pin to be removed to disassemble the tube cutter I have formed in the ring 16 a second opening 18 which is so arranged that when the pin 13 is in its retracted position, as shown in dotted lines in Fig. 4, the opening 18 in the ring will lie substantially in line with the end of the slot 12 opposite the pin, thereby permitting an implement to be inserted through the opening 18 and the slot 12 and to engage the inner end of the pin 13, whereby the latter may be driven out of its seat and removed.

To enable the cutter to be applied to a tube on the outer side of the tube sheet, a suitable positioning device or guard may be mounted on the body portion of the cutter and in Figs. 5 and 6 of the drawings, I have shown such a device applied to a tube cutter similar to that shown in Figs. 1 to 4. This positioning device or guard consists of a short sleeve 19 rotatably mounted on the body portion 2 in front of the flange 11 and preferably bearing against that flange. This sleeve may be positioned on the body portion in any suitable manner but it is preferably rotatable thereon and I have here shown the body portion as having a circumferential groove 20 adapted to receive a resilient ring 21 which when seated in the groove bears against the inner end of the sleeve 19 and holds the same against the shoulder formed by the flange 11. Extending forwardly from the sleeve 19, and preferably formed integral therewith, are two arms 22 which are segmental in cross section and are spaced from the body portion 2 a distance sufficient to permit the walls of the tube to enter the spaces between the same and said body portion.

There may be any suitable number of these arms but, in the present instance, I have shown two and have arranged these on diametrically opposite sides of the body portion. The arms 22 project inwardly beyond the cutter slot 3 and are arranged to engage the tube sheet when the body portion is inserted in the end of a tube projecting beyond the outer surface of the tube sheet. The length of the arms 22 is such that they will so position the tool with relation to the tube sheet that the tube will be severed at such a distance from the tube sheet as to leave a sufficient length of tube to form a bead or to be crimped against the surface of the sheet to secure the tube in place. If desired the sleeve 19 may also have a short flange 23 extending outwardly to bridge the space between the sleeve and the ring 16 and prevent dirt accumulating in this space and working its way into the bearing of the sleeve.

It will be apparent from the foregoing description that I have provided a tube cutter with a very simple but highly efficient guard for the pin 13 which will protect the operator from injury by the pin and will protect the pin itself from being bent or broken, and, which not only constitutes a guard but also serves as an actuating device for the pin and closes the slot through the head 10. It does not in any way interfere with the performance of the usual functions of the pin or of the tube cutter as a whole. Further, I have provided the tube cutter with means for properly positioning the tool on the outer side of the tube sheet, which means is of a simple construction which can be easily applied to or removed from a cutter of this type.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. A tube cutter comprising a body portion having a longitudinal bore and having circumferential slots near the respective ends thereof, said slots communicating with said bore, a tool mounted within said body portion and having a cutting edge extending into one of said slots and adapted to be projected beyond the outer surface of said body portion, a member rotatably mounted in said bore and so connected with said tool that the relative rotation of said member and said body portion will project and retract said cutting edge, a pin extending through the other slot in said body portion and operatively connected with said rotatable member, and a guard rotatably mounted on said body portion adjacent to said other slot and having an opening into which the outer end portion of said pin extends.

2. A tube cutter comprising a body portion having a longitudinal bore and having circumferential slots near the respective ends thereof, said slots communicating with said bore, a tool mounted within said body portion and having a cutting edge extending into one of said slots and adapted to be projected beyond the outer surface of said body portion, a member rotatably mounted in said bore and so connected with said tool that the relative rotation of said member and said body portion will project and retract said cutting edge, a pin extending through the other slot in said body portion and operatively connected with said rotatable member, the outer end portion of said pin projecting beyond the outer surface of said body portion, and a guard ring mounted on the said body portion, overlapping said slot and having an opening into which the outer end of said pin extends, said guard ring being of a thickness approximately equal to the length of that portion of said pin which projects beyond said body portion.

3. A tube cutter comprising a body portion having a longitudinal bore and having circumferential slots near the respective ends thereof, said slots communicating with said bore, a tool mounted within said body portion and having a cutting edge extending into one of said slots and adapted to be projected beyond the outer surface of said body portion, a member rotatably mounted in said bore and so connected with said tool that the relative rotation of said member and said body portion will project and retract said cutting edge, a pin extending through the other slot in said body portion and operatively connected with said rotatable member, and a guard ring rotatably mounted on said body portion and having an opening to receive the end portion of said pin, said guard ring constituting an actuating device for said pin and said tool holder.

4. A tube cutter comprising a body portion having a longitudinal bore and having circumferential slots near the respective ends thereof, said slots communicating with said bore, a tool mounted within said body portion and having a cutting edge extending into one of said slots and adapted to be projected beyond the outer surface of said body portion, a member rotatably mounted in said bore and so connected with said tool that the relative rotation of said member and said body portion will project and retract said cutting edge, a guard ring rotatably mounted on said body portion and having an opening arranged to register with the other of said slots, and a pin extending through said opening and said slot and connected with said rotatable member, said pin serving to retain said guard ring on said body portion and to actuate said rotatable member.

5. A tube cutter comprising a body portion having a longitudinal bore arranged eccentrically to the axis thereof, said body portion also having a circumferential slot near the inner end thereof and a second circumferential slot near the outer end thereof, both of said slots communicating with said bore, a tool holder rotatably mounted in said bore, a tool carried by said tool holder and having a cutting edge extending into the first mentioned slot and adapted to be projected beyond the outer surface of said body portion by the relative rotation of said body portion and said tool holder, a pin extending through said second slot and connected with said tool holder, and a guard ring rotatably mounted on said body portion, overlapping said second slot and having an opening to receive the end portion of said pin.

6. A tube cutter comprising a body portion having a longitudinal bore arranged eccentrically to the axis thereof, said body portion also having a circumferential slot near the inner end thereof and a second circumferential slot near the outer end thereof, both of said slots communicating with said bore, a tool holder rotatably mounted in said bore, a tool carried by said tool holder and having a cutting edge extending into the first mentioned slot and adapted to be projected beyond the outer surface of said body portion by the relative rotation of said body portion and said tool holder, a pin extending through said second slot and connected with said tool holder, and a guard ring rotatably mounted on said body portion and having an opening to receive the end portion of said pin, said guard ring constituting an actuating device for said pin and said tool holder.

7. A tube cutter comprising a body portion having a longitudinal bore, said body portion also having a circumferential slot near the inner end thereof and a second circumferential slot near the outer end thereof, both of said slots communicating with said bore, a tool holder rotatably mounted in said bore, a tool connected with said tool holder and having a cutting edge extending into the first mentioned slot and adapted to be projected beyond the outer surface of said body portion by the relative rotation of said body portion and said tool holder, said tool holder having a transverse opening therethrough adjacent to said second slot, a pin extending through said second slot in said body portion and seated in the opening in said tool holder, a guard ring rotatably mounted on said body portion and having an opening through which the outer end portion of said pin extends, and also having a second opening arranged to be moved substantially into line with said second slot and the inner end of said pin to permit an implement to be applied to said pin for displacing the same.

8. A tube cutter comprising a body portion having a longitudinal bore arranged eccentrically to the axis thereof, said body portion also having a circumferential slot near the inner end thereof and a second circumferential slot near the outer end thereof, both of said slots communicating with said bore, a tool holder rotatably mounted in said bore, a tool carried by said tool holder and having a cutting edge extending into the first mentioned slot and adapted to be projected beyond the outer surface of said body portion by the relative rotation of said body portion and said tool holder, a pin extending through said second slot and connected with said tool holder, a guard ring rotatably mounted on said body portion and having an opening to receive the end portion of said pin, said guard ring constituting an actuating device for said pin and said tool holder, and a structure mounted on said body portion on the outer side of said tool slot and having portions spaced from said body portion and extending beyond said tool slot to engage a tube sheet and position the cutting tool within said tube and on the outer side of said tube sheet.

9. A tube cutter comprising a body portion having a longitudinal bore, and having a circumferential slot near the inner end thereof and communicating with said bore, a tool holder rotatably mounted in said bore, a tool connected with said tool holder and having a cutting edge extending into said slot and adapted to be projected beyond the outer surface of said body portion by the relative rotation of said body portion and said tool holder, means for rotating said tool holder relative to said body portion, a structure mounted on said body portion, held against lengthwise movement relatively thereto, and having inwardly extending portions spaced from said body portion and extending beyond said tool slot.

10. A tube cutter comprising a body portion having a longitudinal bore arranged eccentrically to the axis thereof, and having a circumferential slot near the inner end thereof and communicating with said bore, a tool holder rotatably mounted in said bore, a tool carried by said tool holder and having a cutting edge extending into said slot and adapted to be projected beyond the outer surface of said body portion by the relative rotation of said body portion and said tool holder, means for rotating said tool holder relative to said body portion, a sleeve rotatably mounted on said body portion, held against longitudinal movement relatively thereto, and having two arms, segmental in cross section, spaced from said body portion and extending inwardly beyond said tool slot.

11. A tube cutter comprising a body portion having a longitudinal bore arranged eccentrically to the axis thereof, said body portion also having a circumferential slot near the inner end thereof and a second circumferential slot near the outer end thereof, both of said slots communicating with said bore, a tool holder rotatably mounted in said bore, a tool carried by said tool holder and having a cutting edge extending into the first mentioned slot and adapted to be projected beyond the outer surface of said body portion by the relative rotation of said body portion and said tool holder, a pin extending through said second slot and connected with said tool holder, a guard ring rotatably mounted on said body portion and having an opening to receive the end portion of said pin, said guard ring constituting an actuating device for said pin and said tool holder, a sleeve rotatably mounted on said body portion, said body portion having a shoulder to limit the movement of said sleeve in one direction, and means to prevent the movement of said sleeve in the opposite direction, said sleeve having inwardly extending arms, segmental in cross section, spaced from the outer surface of said body portion and extending inwardly beyond said tool slot.

12. A tube cutter comprising a body portion having a longitudinal bore and having circumferential slots near the respective ends thereof, said slots communicating with said bore, a tool mounted within said body portion and having a cutting edge extending into one of said slots and adapted to be projected beyond the outer surface of said body portion, a member rotatably mounted in said bore and so connected with said tool that the relative rotation of said member and said body portion will project and retract said cutting edge, a pin extending through the other slot in said body portion and operatively connected with said rotatable member, a guard rotatably mounted on said body portion adjacent to said other slot and having an opening into which the outer end portion of said pin extends, a sleeve rotatably mounted on said body portion, said body portion having a shoulder to position one end of said sleeve adjacent to said guard, and said sleeve having arms projecting from the other end thereof, spaced from said body portion and extending beyond said tool slot, said sleeve also having a circumferential flange extending across said shoulder to bridge the space between said sleeve and said guard.

In testimony whereof, I affix my signature hereto.

GUSTAV WIEDEKE.